United States Patent
Sun et al.

(10) Patent No.: US 10,140,051 B1
(45) Date of Patent: Nov. 27, 2018

(54) BACKUP FILES TO A DISK IMAGE

(71) Applicant: CA, Inc., Islandia, NY (US)

(72) Inventors: Chuanqi Sun, Beijing (CN); Zhiye Wang, Beijing (CN)

(73) Assignee: CA, Inc., New York, NY (US)

( * ) Notice: Subject to any disclaimer, the term of this patent is extended or adjusted under 35 U.S.C. 154(b) by 963 days.

(21) Appl. No.: 14/050,518

(22) Filed: Oct. 10, 2013

(51) Int. Cl.
  *G06F 12/00* (2006.01)
  *G06F 3/06* (2006.01)
(52) U.S. Cl.
  CPC ............ *G06F 3/065* (2013.01); *G06F 3/0614* (2013.01); *G06F 3/0683* (2013.01)
(58) Field of Classification Search
  CPC ....... G06F 3/065; G06F 3/0614; G06F 3/0683
  See application file for complete search history.

(56) References Cited

U.S. PATENT DOCUMENTS

| | | | |
|---|---|---|---|
| 8,484,427 B1* | 7/2013 | Goldobin et al. | 711/162 |
| 2013/0054888 A1* | 2/2013 | Bhat et al. | 711/114 |
| 2013/0159646 A1* | 6/2013 | Atzmon et al. | 711/162 |
| 2013/0166521 A1* | 6/2013 | Ghatty | G06F 11/1469 707/695 |
| 2013/0173547 A1* | 7/2013 | Cline | G06F 17/303 707/638 |
| 2014/0181443 A1* | 6/2014 | Kottomtharayil et al. | 711/162 |

* cited by examiner

*Primary Examiner* — Reginald Bragdon
*Assistant Examiner* — Mehdi Namazi
(74) *Attorney, Agent, or Firm* — Meyertons, Hood, Kivlin, Kowert & Goetzel, P.C.

(57) ABSTRACT

Performing a file backup includes receiving a file to backup from a source machine and performing a write operation to write the file to a mount point in a file system on a backup server. The backup also includes intercepting a block-level data block to be written which is generated by the write operation; and writing the block-level data block to a corresponding, respective block of a disk image file having a plurality of blocks.

12 Claims, 8 Drawing Sheets

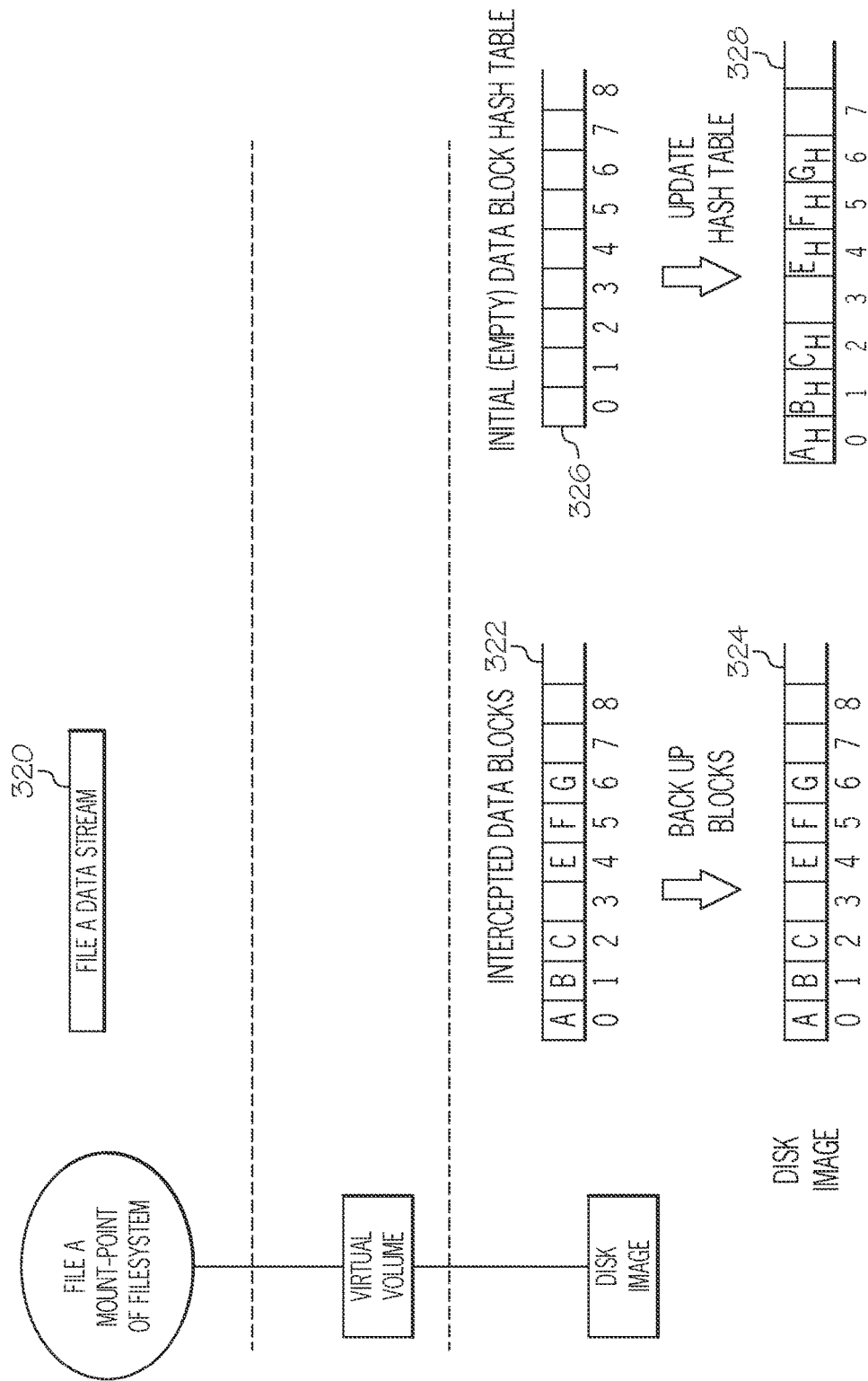

INTERCEPTED DATA BLOCKS

INCREMENTAL DISK IMAGE BLOCKS

LAST HASH TABLE ENTRIES

UPDATED HASH TABLE ENTRIES

US 10,140,051 B1

BACKUP FILES TO A DISK IMAGE

BACKGROUND

The present disclosure relates to data backups, and more specifically, to file-level and block-level backups.

When backing up data, two different methods are typically used. One method is file-level backups which performs the backup task by copy files and directories to a separate folder (or directory) structure. The granularity of this type of backup allows a small subset of folders or files to be designated for backup. Also this method allows flexible backup policies for different data types on the same volume. For example, the backup policies for documents, photographs, videos, etc. can all be different even though they reside on the same volume. This method also has detriments such as being time consuming for large amounts of data and copying a whole file during a backup operation even though only a small portion of the file may have changed.

Another backup method is at the block-level. A block-level backup is defined at blocks which are generally a group of disk sectors. This type of backup is at a lower level than files and folders and is performed below the file system level. Generally, block-level backups are used to accomplish disk-to-disk copies or volume-to-volume copies. Block-level backups allow backing up or restoring an entire volume or disk as block units. Block-level backups utilize more sophisticated software than file-level backups and typically require kernel-level drivers such as a snapshot driver and a change tracking driver to perform their tasks.

BRIEF SUMMARY

According to one aspect of the present disclosure, a system includes a processor; a storage device coupled to the processor, and a memory coupled to the processor, the memory configured to store program code executable by the processor. In particular, the program code, when executed by the processor, is configured to receive a file to backup from a source machine and to perform a write operation to write the file to a mount point of a file system on the storage device. The program code, when executed by the processor, is also configured to intercept a block-level data block to be written which is generated by the write operation and to write the block-level data block to a corresponding, respective block of a disk image file having a plurality of blocks.

According to another aspect of the present disclosure, a method includes receiving, by a computer, a file to backup from a source machine and performing, by the computer, a write operation to write the file to a mount point of a file system on the computer. The method also includes intercepting a block-level data block to be written which is generated by the write operation; and writing the block-level data block to a corresponding, respective block of a disk image file having a plurality of blocks.

According to another aspect of the present disclosure, a computer program product includes a computer readable storage medium having computer readable program code embodied therewith. The computer readable program code includes computer readable program code configured to receive a file to backup from a source machine; to perform a write operation to write the file to a mount point of a file system on a backup server; intercept a block-level data block to be written which is generated by the write operation; and to write the block-level data block to a corresponding, respective block of a disk image file having a plurality of blocks.

BRIEF DESCRIPTION OF THE DRAWINGS

Aspects of the present disclosure are illustrated by way of example and are not limited by the accompanying figures with like references indicating like elements.

FIG. 3B illustrates a logical diagram of how further details of how a disk image is constructed in accordance with the principles of the present disclosure.

DETAILED DESCRIPTION

Figure 1:
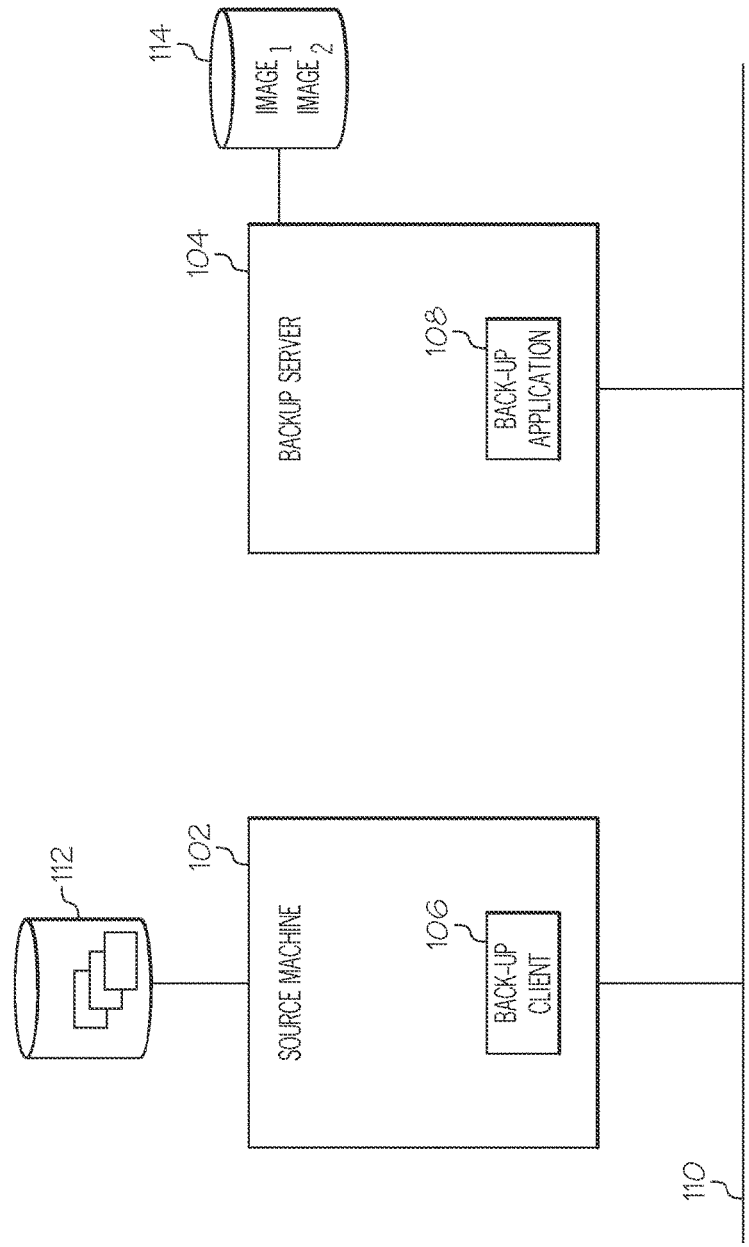
FIG. 1 illustrates an example computing environment for performing data backups in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including MAINFRAME Assembler, an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, a "block" is a uniformly sized unit of storage for a file system (e.g., a block can be 4 KB in size). Thus, a file system that is 400 KB in size would be comprised of 100 blocks. The file system includes methods and data structures that an operating system uses to keep track of files on a disk. It allows the user to assign symbolic names to files and directories while maintaining a record of the specific blocks that contain the data within those files and directories. Typically, the actual data stored on the disk will be organized according to a file system which is implemented within an operating system. User applications executing within that operating system access data on the disk according to the file system's organization.

When a read or write request for data is received, the operating system determines the blocks of the file system that are needed to satisfy the request and then requests those blocks from the disk. At a disk device driver level, or possibly, at a disk hardware interface level, a block number is translated into a physical location and data stored at that physical location is retrieved from, or written to, the disk.

A "disk image" is a single file containing the complete contents and structure representing a data storage medium or device, such as a hard drive. A disk image is usually created by creating a complete sector-by-sector copy of the source medium and thereby perfectly replicating the structure and contents of a storage device. Also, as used herein, the terms "folder" and "directory" are intended to be synonymous as they both refer to a way to organize groups of files in a hierarchical tree-like structure. A "volume" is a single accessible storage area with a single file system and is typically resident on a single partition of a hard disk. A volume exists at the logical operating system level and partitions exist at the physical media-specific level. Thus, an operating system can recognize a partition without necessarily recognizing any volume associated with it (e.g., when the operating system cannot interpret the file system type stored on the partition). A hard disk may, for example, have two partitions "hda1" and "hda2" and on each partition resides a respective file system (e.g., files, directories, and organizational meta data). The operating system can assign a label to each partition's file system such as "C:" and "D:" to create two volumes known as "C:" and "D:" in the operating system.

FIG. 1 illustrates an example computing environment for performing data backups in accordance with the principles of the present disclosure. In the example environment there is a source machine 102 where the source files to be backed up are located. For example, the source files and folders 112 may be stored in a disk drive or other storage device. One of the applications that can execute on the source machine 102 is a backup client 106. Using the backup client 106, a user can define flexible backup policies for the files and folders 112 that involve full or incremental backups of some or all of these files and folders 112. In particular, the user can use the back-up client 106 to define the backup policies at the file level (as opposed to the block level).

The environment of FIG. 1 also includes a backup server 104 on which is executing a backup application 108. The backup application 108 and the backup client can communicate with one another over a network connection 110. The backup client 106 determines the files and folders that need to be backed up according to the user defined backup policies. This is performed at the file level and a stream of data representing the files is sent to the backup application 108. Once the backup application 108 receives the data then it can launch routines to store the received data to the destination 114. As described more fully below, the writing of the data to the destination 114 can be performed at the block-level. As a result, copies of the files and folders 112 of the source machine 102 are created and stored at a destination storage device 114. As described more fully below, the copies that are created are done so at the block level such that the copies on the storage device 114 resemble disk images.

Figure 2A:
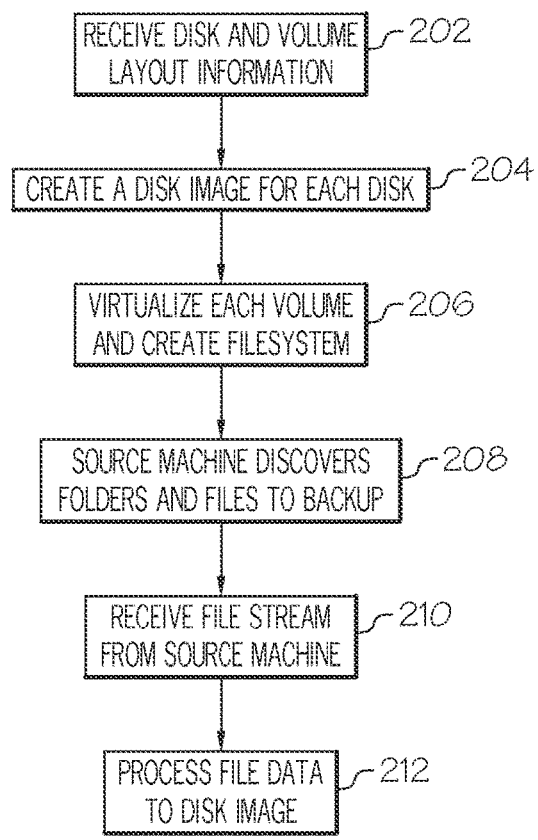
FIG. 2A is a flowchart of an example process for backing up files to a disk image in accordance with the principles of the present disclosure.

FIG. 2A is a flowchart of an example process for backing up files to a disk image in accordance with the principles of the present invention. Before the backup application 108 initiates, or causes the client 106 to initiate, any backup jobs, the backup application 108 and the backup client 106 exchange information about the storage devices where the files and folders 112 are located attached to the source machine 102. In the description below, operation of various backup processes and functions are described with respect to a single disk drive and its associated single disk image. One of ordinary skill will recognize that the described processes and functions can be repeated for additional disk drives without departing from the scope of the present disclosure.

Thus, in step 202, the backup application 108 receives from the backup client 106 a description of the disk and volume layout of the disk drive with the files and folders 112. The disk information includes the number of logical blocks on the disk. The volume layout information would include which blocks are associated with each volume. For example on a disk having n blocks, a "C:" volume may utilize blocks 1 through x and the "D:" volume utilize blocks x+1 through n. In general, the backup application 108 obtains information from the backup client 106 about: the number of different disks, each disk's size (in blocks), the number of different volumes, each volume's size, and the file system type of each volume.

Once the backup application 108 receives this information, a disk image can be created, in step 204, for the disk drive with the files and folders 112. While there is no data besides its metadata including the disk size and the parent disk image if it exists at the present time in the disk image, the backup application 108 can define the data structure and label that will become the disk image.

Figure 2B:
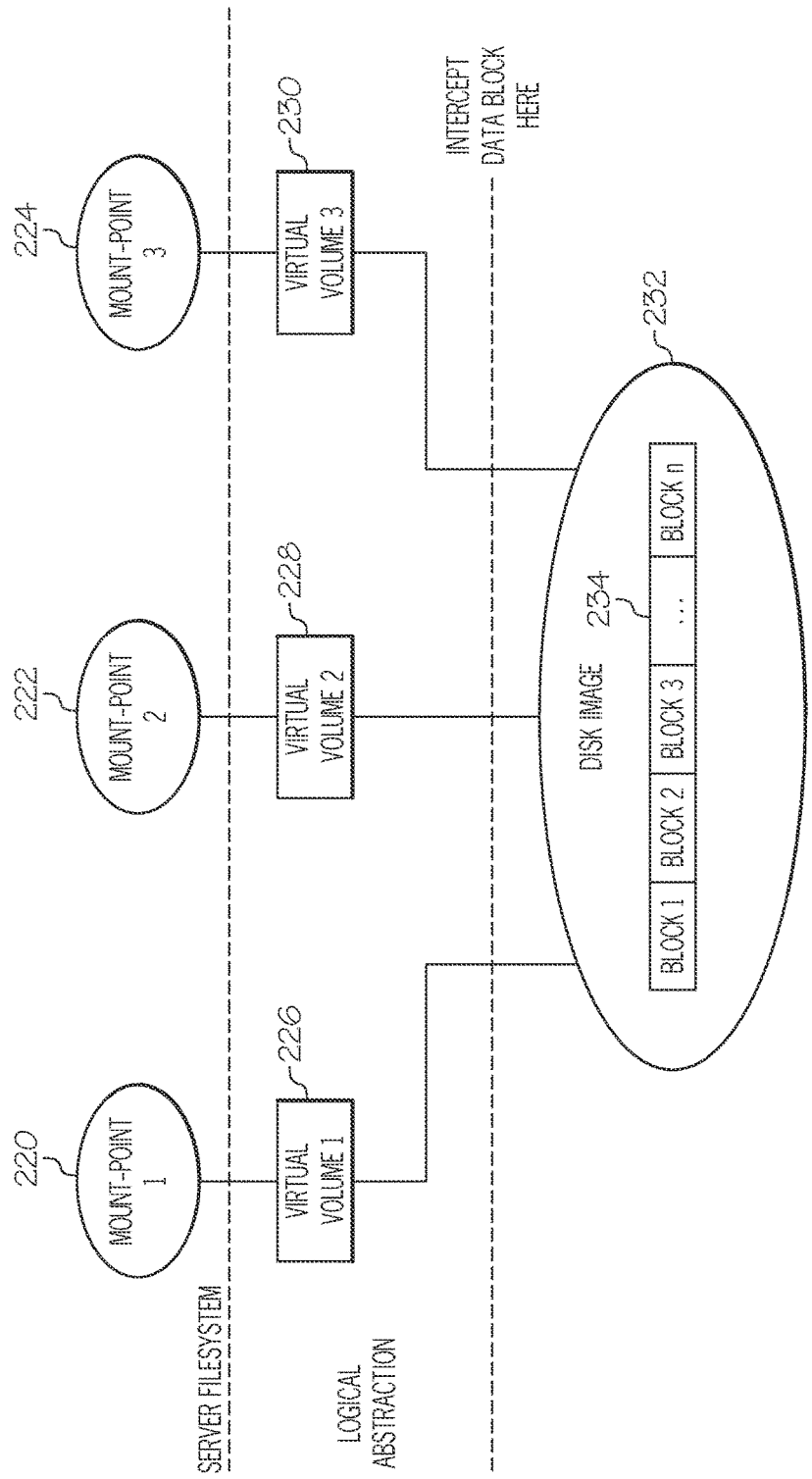
FIG. 2B illustrates a logical diagram of how a disk image is constructed in accordance with the principles of the present disclosure.

FIG. 2B illustrates a logical diagram of how a disk image is constructed in accordance with the principles of the present disclosure. In the example of FIG. 2B, there are three volumes of one disk drive shown. Because there are three volumes on the disk, the disk image can be considered to have three different sections. Each of the three sections representing one of the volumes. In step 206, the backup application 108 virtualizes each volume device on the disk image and creates a file system for each of the volumes.

The backup application 108, within the file system of the backup server 104, creates a respective folder for each of the three different volumes. For example, the folders could be named:

/backup/source/vol1
/backup/source/vol2
/backup/source/vol3 and each of the folders can be treated as a mount point within the file system of the server 104 and its operating system.

For each of the three volumes, the backup application 108 can use the respective volume size and file system type to create a corresponding file system. Each of the three file systems can then be mounted to one of the appropriate mount points by the operating system of the backup server 104. Thus, the three volumes that make up the disk image are virtualized within the file system of the server 104. In other words, if an application on the server 104 were to write a file to one of the mount points, the backup application 108 could recognize that data as being written to one of the three volumes that are part of the disk that is being backed up to a disk image. In FIG. 2B there are three mount points 220, 222, 224 that correspond to the three volumes on an example disk drive of the source machine 102. Each of the mount point 220, 222, 224 correspond to an emulated volume (or section) 226, 228, 230 of the disk image 232.

Thus, when file contents are received from the source machine 102 a write operation to the mount-point folder acts as a normal file system write to a physical disk drive. The operating system will convert the file system write to a block-level write request to one of the file systems created and controlled by the backup application 108. Thus, the backup application 108 can intercept the block-level data in the file system write request and process the data before writing it to the disk image 232 as one or more blocks 234.

Returning back to the flowchart of FIG. 2A, once the volumes and file systems are created, a backup job can be initiated which, in step 208, causes the source machine 102 to discover folders and files that are to be backed up in accordance with the predefined policies and rules. In step 210, the file stream is received by the backup application 108 where the backup application 108 processes the file data and writes one or more blocks to the disk image 232. The actual disk image file is a single file written to a hard drive by the backup server's operating system, thus the disk image 232 of FIG. 2B is conceptual in nature in that on the hard drive of the server 104, the first block of the disk image file is not likely located at a logical block address of "1" for that hard drive.

Backups can be classified according to whether it is a full backup or an incremental backup. A full backup assumes that no previous files have been backed up and the backup process will make a copy of all the files and folders received from the source machine. An incremental backup, on the other hand, backs up only files and folders that have changed since the last full or incremental backup. Therefore a restore from an incremental backup will utilize the most recent full backup relative to the used incremental backup and all the incremental backups until the time of the used incremental backup.

Figure 3A:
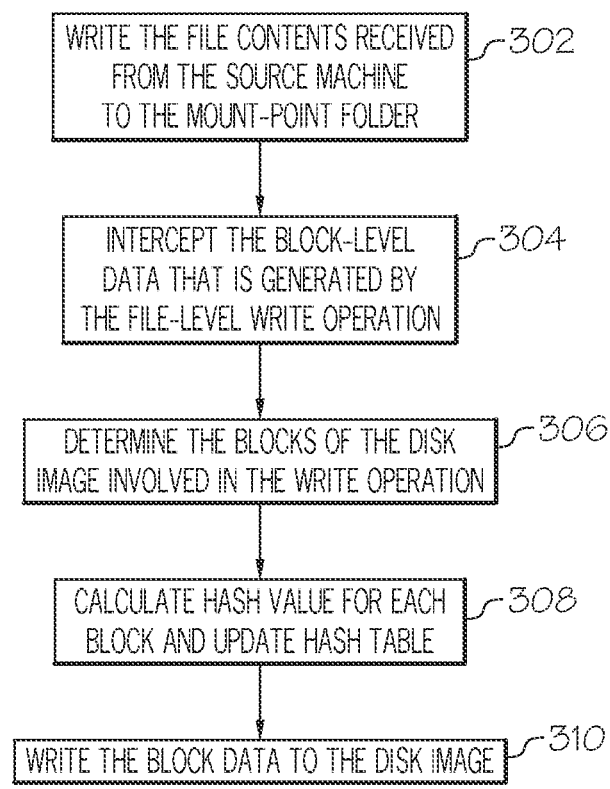
FIG. 3A is a flowchart of an example process for performing a full backup to a disk image in accordance with the principles of the present disclosure.

FIG. 3A is a flowchart of an example process for performing a full backup to a disk image in accordance with the principles of the present disclosure. The full backup process of FIG. 3A is presented with respect to one file or folder from the source machine; the same process would be repeated for all the source files and folders that are to be copied.

A backup application 116 on the backup server 104 would receive the file contents from the source machine 102 of a file to be backed up. Afterwards, in step 302, the backup application 108 can write the received file contents to the mount point folder.

The writing of the file to the mount-point folder causes the operating system of the backup server 104 to generate block level write requests from the file system that the backup application 108 has virtualized at that mount point. The usual file system metadata maintains structures such as inodes and superblocks to track what blocks a file occupies within a file system. Thus, when a file system write occurs to one of the mount points, file names, inodes, and block addresses are all created or used to locate the blocks of the "virtual volume" where that file is to reside or already resides. However, the block data does not actually get physically written to blocks of that virtual volume; instead it is intercepted below the file system by the backup application 108 and processed as described herein.

The block-level data includes blocks that have an address which is an offset value from the start of their respective virtual volume. Thus, block "8" is the eighth sequential block starting from the beginning of the virtual volume. However, as mentioned above, each "virtual volume" is associated with a different contiguous portion of the disk image. Thus, if the second virtual volume, for example, started at block "100" of the disk image, then block "8" in that virtual volume is actually block "108" of the disk image.

Therefore, when the block-level data is intercepted by the backup application 108, a determination has been made by the operating system and file system, in step 306, as to what blocks of the disk image are involved in the write request. When a file has never been copied before, then the file system can write the file to any open blocks; however, if the file has previously been written to the disk image, then the inode tables and other file system data structures and functions can determine the blocks occupied by that file (relative to the beginning of the virtual volume).

In accordance with the principles of the present disclosure, a hash table of the blocks written to the disk image is maintained by the backup application 108. For example, a disk image may have 100 blocks with each block size being 4K bytes. A hash table can be created, and stored separately from the disk image, that is 100 bytes in length. Each byte of the hash table represents a hash value of one of the blocks of the disk image. In other words, the 45$^{th}$ byte of the hash table includes 8-bits that represent a hash value for the 45$^{th}$ block of the disk image. One of ordinary skill will recognize that different size hash tables and different hash calculation algorithms can be used without departing from the scope of the present disclosure. The purpose of the hash process is to generate a value that changes whenever any part of its corresponding disk image block changes. The much-shorter size of the hash value allows it to be tested easier than evaluating all bits of the corresponding data block.

Thus, in step 308, for every block that is to be written to the disk image (all blocks for a full backup) a hash value is calculated and the hash table is updated. The backup application 108 then, in step 310, writes the blocks to the disk image. As mentioned above, the block address in the disk image takes into account the block number within a virtual volume and the offset value of that virtual volume relative to the starting block of the disk image.

FIG. 3B illustrates a logical diagram of how further details of how a disk image is constructed in accordance with the principles of the present disclosure. For example, a write of "File A" to one of the mount points can be performed by an application executing on the server 104. At this stage, the application is writing a file data stream 320. This write operation results in the operating system of the server 104 to generate block-level write data 322 which is intercepted by the backup application 108. For example, the backup application 108 determines that blocks 0, 1, 2, 4, 5, and 6 were chosen by the operating system to be used to store "File A". Thus, the block-level write requests for "File A" may involve blocks: 0, 1, 2, 4, 5, and 6 which have the respective values: A, B, C, E, F, and G. These block numbers are relative to the first block of the virtual volume where "File A" is located. The "File A" is just used to describe the block write process, but it isn't used by the backup application 108 here. The backup application 108 focuses on the data blocks, not the file. In a full backup, the backup application 108 will write all the blocks to disk image blocks 324. The address of the blocks within the disk image is a combination of both where the virtual volume starts within the disk image and the block offset value of the file's data blocks within the virtual volume.

Initially the hash table 326 for the disk image is empty. Once the backup application 108 determines which of the blocks 322 are to be backed up in the disk image 324, the hash values for these blocks are calculated. The hash values are then used to produce an updated hash table 326. Similar to before, if block "8" of a virtual volume is to be backed up and that virtual volume starts at block "100" of the disk image, then hash value "108" of the disk image hash table is updated.

Figure 3C:
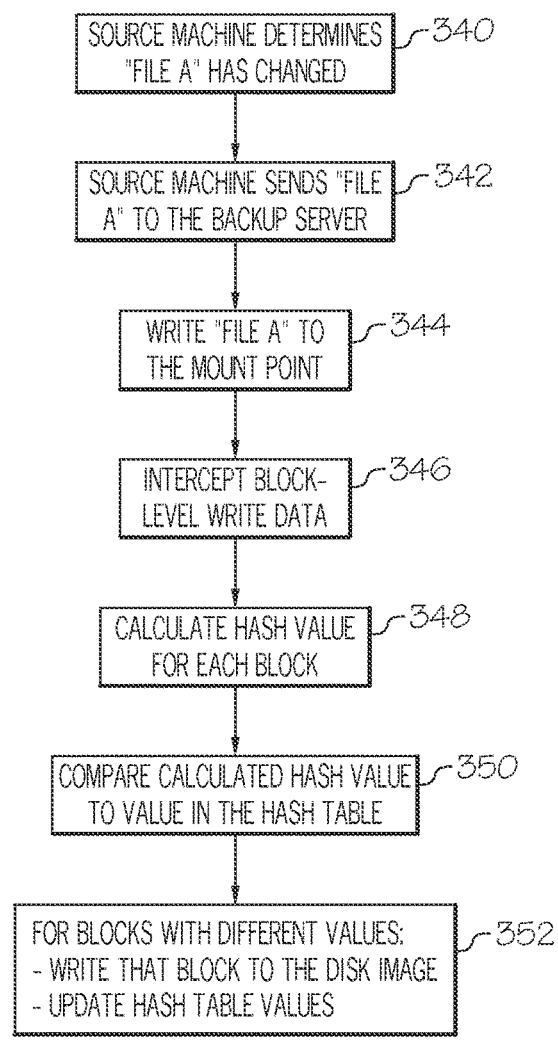
FIG. 3C is a flowchart of an example process for performing an incremental backup to a disk image in accordance with the principles of the present disclosure.
Figure 3D:
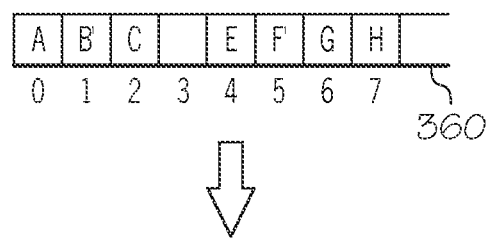
FIG. 3D illustrates a logical diagram of how further details of how an incremental disk image is constructed in accordance with the principles of the present disclosure.
Figure 3D:
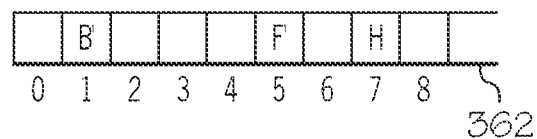
Figure 3D:
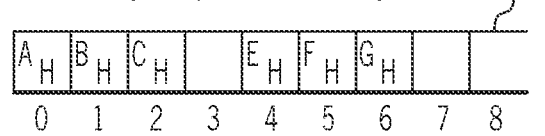
Figure 3D:
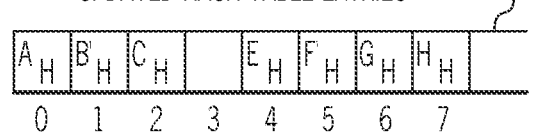

FIG. 3C is a flowchart of an example process for performing an incremental backup to a disk image in accordance with the principles of the present disclosure. An incremental backup can generate its own disk image file separate from the full backup disk image file described above. The disk image can also record its parent disk image (the last incremental backup disk image or the full backup disk image) in its metadata. Then they can be used to determine where the data are located in the disk image link when performing a restore job. However, the block numbers, offsets, and mount points remain consistent between the two disk image files. When performing an incremental back, the source machine, in steps 340 and 342, determines that "File A" (the example file from FIG. 3B) has changed and sends "File A" to the backup server 104. In step 344, the backup application 108 writes "File A" to the appropriate mount point which generates block-level write requests at the operating system. The backup application 108 intercepts the block-level write requests in step 346 and a respective hash value is calculated for each block that is included with the block-level write requests, in step 348. For example, the block-level write requests for "File A" may involve blocks: 0, 1, 2, 4, 5, 6, and 7 (element 360 of FIG. 3D) which have the respective values: A, B', C, E, F', G, and H.

In step 350, the backup application 108 compares each of the calculated seven hash values to their respective counterpart in the disk image hash table 328. In this example, the hash values $B_H'$, $F_H'$ are different from $B_H$, $F_H$ and $H_H$ is a new added value, so the backup application 108 could determine that of the seven blocks 360 associated with "File A", only blocks 1, 5 and 7 have changed since "File A" was previously copied. Thus, in step 352, the backup application 108 writes only blocks 1, 5, and 7 to the blocks of the incremental backup disk image file (element 362 of FIG. 3D). Also, in step 352, the backup application updates the hash values of entries 1, 5, and 7 of the hash table 328 to generate a new hash table 364. The other values in the hash table 328 are not changed and remain the same in the new hash table 364.

Compared to a file-level backup, a backup application in accordance with the principles of the present disclosure backs up only changed blocks of a file rather than the entire file. Also, because the backup form is that of a disk image, it can be used like a volume restore procedure which typically uses simpler logic and is faster than other types of recovery operations. Compared to a volume-level, or block-level, backup no kernel-level drivers need to be used on a source machine; and because the backup appears to be at the file-level on the source machine the defining of backup policies is easy and flexible.

Figure 4:
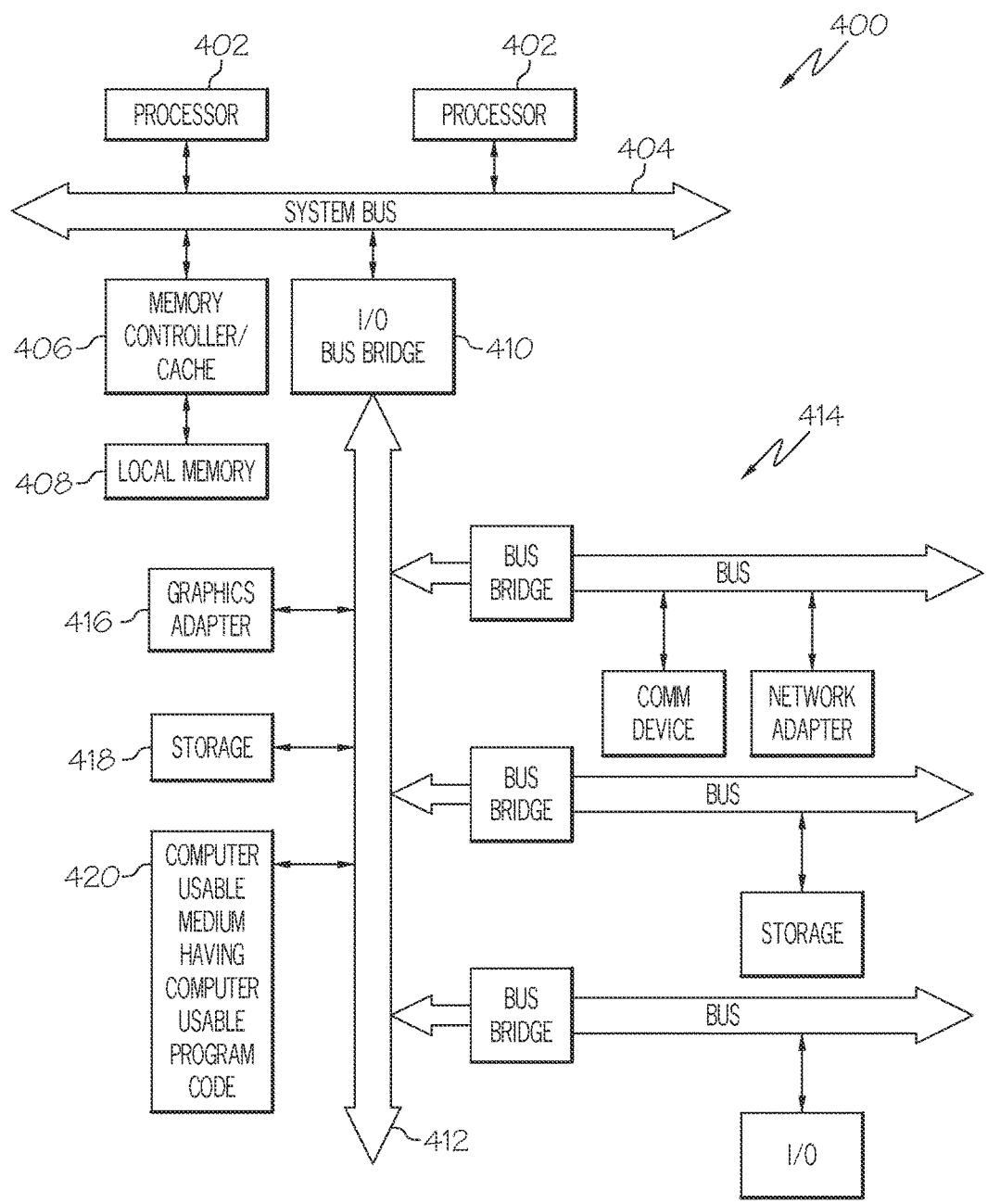
FIG. 4 illustrates a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 104 or aspects thereof, e.g., as set out in greater detail in FIG. 1-FIG. 3D, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement any aspect of the methods, computer program products and/or system components illustrated in FIG. 1-FIG. 3D.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   receiving, by a computer, a copy of a file to backup from a source machine different than the computer, wherein the file is stored on a first disk drive of the source machine;
   performing, by the computer, a write operation to write the copy of the file to a mount point of a file system on a second disk drive of the computer;
   intercepting, by the computer, a block-level data block to be written which is generated by the performed write operation;
   writing, by the computer, the block-level data block to a corresponding, respective block of a disk image file having a plurality of blocks,
   wherein the disk image file comprises a disk image of the first disk drive of the source machine;
   determining, by the computer, a respective block address in the disk image file of the intercepted block-level data block;
   creating, by the computer, a hash table, wherein the hash table comprises a corresponding, respective entry for each of the plurality of blocks of the disk image file; and
   determining if the intercepted block-level data block is different than that of a previously received version of the file.

2. The method of claim 1, wherein determining if the intercepted block-level data block is different comprises:
   calculating, by the computer, a hash value for the intercepted block-level data block;
   comparing the hash value of the intercepted block-level data block value to its corresponding entry of the hash table; and
   determining the intercepted block-level data block is different when the calculated hash value is different than the corresponding entry of the hash table.

3. The method of claim 2, comprising:
   changing the corresponding entry of the hash table to the calculated hash value only when the intercepted block-level data block is determined to be different.

4. The method of claim 2, comprising:
   writing, by the computer, the block-level data block to a corresponding, respective block of a disk image file only when the intercepted block-level data block is determined to be different.

5. A system comprising:
   a processor, a storage device coupled to the processor, and a memory coupled to the processor, the memory configured to store program code executable by the processor;
   the program code, when executed by the processor, configured to receive a copy of a file to backup from a source machine different than the system, wherein the file is stored on a first disk drive of the source machine;
   the program code, when executed by the processor, configured to perform a write operation to write the copy of the file to a mount point of a file system on the storage device;

the program code, when executed by the processor, configured to intercept a block-level data block to be written which is generated by the performed write operation;

the program code, when executed by the processor, configured to write the block-level data block to a corresponding, respective block of a disk image file having a plurality of blocks, wherein the disk image file comprises a disk image of the first disk drive of the source machine;

wherein the program code, when executed by the processor, is further configured to determine a respective block address in the disk image file of the intercepted block-level data block;

wherein the program code, when executed by the processor, is further configured to create a hash table, wherein the hash table comprises a corresponding, respective entry for each of the plurality of blocks of the disk image file; and wherein the program code, when executed by the processor, is further configured to determine if the intercepted block-level data block is different than that of a previously received version of the file.

6. The system of claim 5, wherein the program code configured to determine if the intercepted block-level data block is different is configured to:

calculate a hash value for the intercepted block-level data block; compare the hash value of the intercepted block-level data block value to its corresponding entry of the hash table; and determine the intercepted block-level data block is different when the calculated hash value is different than the corresponding entry of the hash table.

7. The system of claim 6, wherein:

the program code, when executed by the processor, is further configured to change the corresponding entry of the hash table to the calculated hash value only when the intercepted block-level data block is determined to be different.

8. The system of claim 6, wherein:

the program code, when executed by the processor, is further configured to write the block-level data block to a corresponding, respective block of a disk image file only when the intercepted block-level data block is determined to be different.

9. A computer program product comprising:

a non-transitory computer readable storage medium having computer readable program code embodied therewith, the computer readable program code comprising:

computer readable program code configured to receive a copy of a file to backup from a source machine separate from a backup server, wherein the file is stored on a first disk drive of the source machine;

computer readable program code configured to perform a write operation to write the copy of the file to a mount point of a file system on the backup server;

computer readable program code configured to intercept a block-level data block to be written which is generated by the performed write operation;

computer readable program code configured to write the block-level data block to a corresponding, respective block of a disk image file having a plurality of blocks, wherein the disk image file comprises a disk image of the first disk drive of the source machine;

computer readable program code configured to determine a respective block address in the disk image file of the intercepted block-level data block;

computer readable program code configured to create a hash table, wherein the hash table comprises a corresponding, respective entry for each of the plurality of blocks of the disk image file; and computer readable program code configured to determine if the intercepted block-level data block is different than that of a previously received version of the file.

10. The computer program product of claim 9, comprising:

computer readable program code configured to calculate a hash value for the intercepted block-level data block;

computer readable program code configured to compare the hash value of the intercepted block-level data block value to its corresponding entry of the hash table; and computer readable program code configured to determine the intercepted block-level data block is different when the calculated hash value is different than the corresponding entry of the hash table.

11. The computer program product of claim 10, comprising:

computer readable program code configured to change the corresponding entry of the hash table to the calculated hash value only when the intercepted block-level data block is determined to be different.

12. The computer program product of claim 10, comprising:

computer readable program code configured to write the block-level data block to a corresponding, respective block of a disk image file only when the intercepted block-level data block is determined to be different.

* * * * *